March 12, 1957 W. W. GLEASON 2,784,422
COIL SPRING ASSEMBLY
Filed Feb. 18, 1954
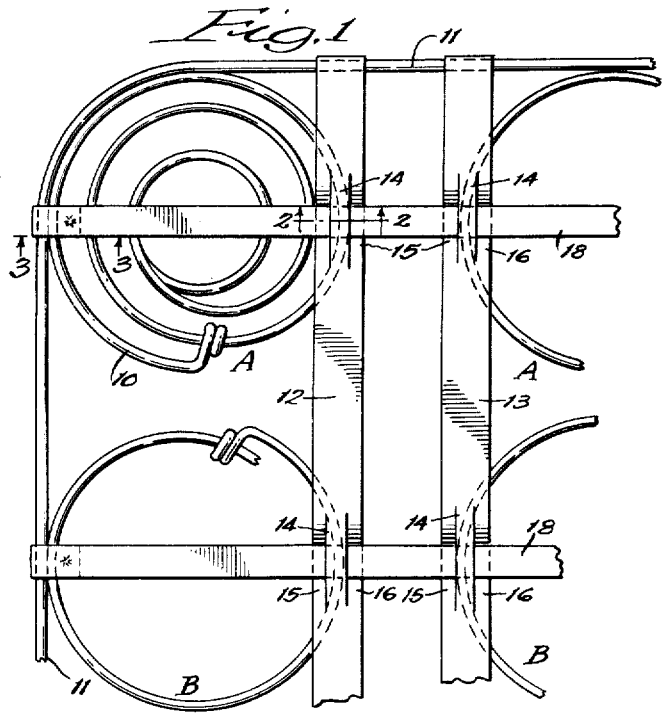
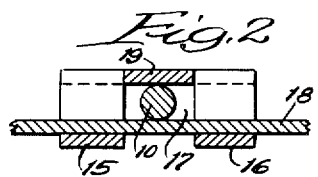
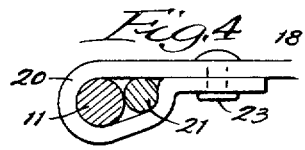
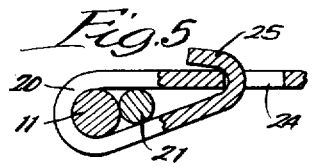
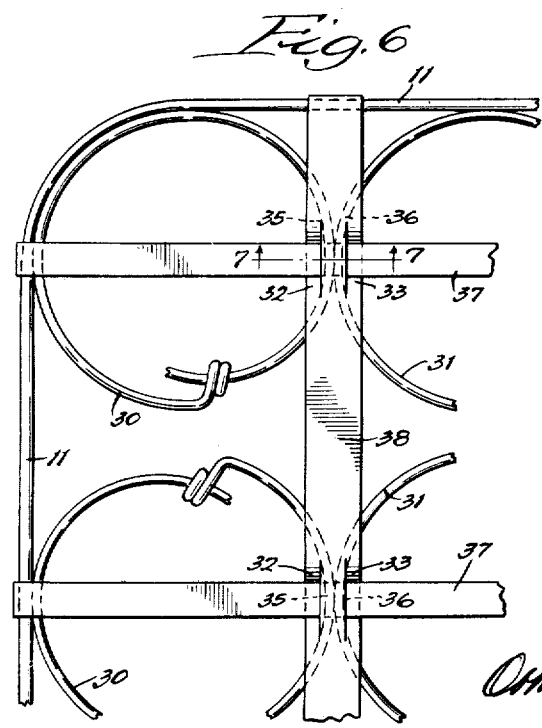
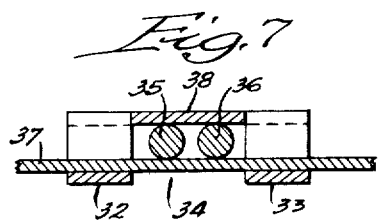
INVENTOR.
William W. Gleason
BY
Osmo, McDougall, Williams & Hersh,
ATTORNEYS.

United States Patent Office 2,784,422
Patented Mar. 12, 1957

2,784,422
COIL SPRING ASSEMBLY

William W. Gleason, Chicago, Ill., assignor to Nachman Corporation, Chicago, Ill., a corporation of Illinois Application February 18, 1954, Serial No. 411,101

2 Claims. (Cl. 5—277)

This invention relates to a spring assembly such as used in bed springs, mattresses and upholstered furniture and it relates more particularly to the assembly of coil springs in a simple and efficient manner to form a unitary structure having markedly improved characteristics and it is an object of this invention to produce and to provide a method for producing same.

More specifically, it is an object of this invention to provide a method of assembly in which a plurality of coil springs are joined in a very efficient and simple manner to form a composite spring unit, in which relatively few parts are required in the process to effect the assembly and in which assembly can be effected with a minimum number of operations capable of being supplied without the necessity for excessive handling of the unit or for transportation of the unit from one device to another in effecting the assembled relation, and it is a related object to produce a spring assembly of the type described such as for use in bed springs, mattresses, furniture and the like in which the coils are relatively permanently fixed in their assembled relation while enabling sufficient flexibility for use and in which a relatively smooth surface is provided for support of the various elements used in combination with the spring in the manufacture of bed springs, mattresses, furniture and the like.

These and other objects and advantages of this invention will hereinafter appear and for purposes of illustration, but not of limitation, embodiments of the invention are shown in the accompanying drawing, in which—

Figure 1 is a top plan view of a fragmentary portion of a spring assembly embodying features of this invention;

Figure 2 is a sectional elevational view taken along the line 2—2 of Figure 1;

Figure 3 is a sectional elevational view taken along the line 3—3 of Figure 1;

Figure 4 is a sectional view taken along the line 3—3 of Figure 1 but showing a modification in the means for attachment;

Figure 5 is a sectional view taken substantially along the line 3—3 showing a still further modification of attachment;

Figure 6 is a top plan view similar to that of Figure 1 showing a modification in the assembly of a spring unit embodying features of this invention, and Figure 7 is a sectional elevational view taken along the line 7—7 of Figure 6.

In general, a spring assembly of the type described makes use of a plurality of helical coil springs 10 which may be of a single conical shape or formed with a double cone effect with the terminal coils of larger dimension than the intermediate coils. The helical coil springs are confined within the area between upper and lower border frame members 11 in the form of wires, rods or bars of heavier gauge than that of the spring coils and to which the upper and lower terminal coils of the outer coil springs are attached. Thus the frame members 11 define the outer edges of the assembly and the contour of the spring unit. Between the frame members, the coil springs 10 may be arranged crosswise and lengthwise in aligned rows A and B with the coil springs spaced one from another, as in the arrangement illustrated in Figure 1, or the coil springs in one row may be in side by side relation while the one row A is spaced from the adjacent row B, as in Figure 2, or the coil springs may be in side by side relation laterally as well as longitudinally within the rows to provide a more compact unit.

The improvement embodying features of this invention resides chiefly in the means for securing the coil springs in their assembled relation in the unit in a manner which militates against displacement, as by slippage, but in which the assembled relation can be effected in a simple and efficient manner not heretofore available in the art.

Referring first to the assembly in which coil springs 10 are spaced one from another in the rows, as illustrated in Figure 1, the coil springs 10 are secured in their assembled relation by a plurality of elongate metal straps or bands 12 and 13 which extend lengthwise in laterally spaced apart parallel relation over the lateral edge portions 14 of the terminal coils. In the portions of the metal bands overlapping the edge portions of the terminal coils, the bands are formed with a pair of laterally spaced splits through intermediate portions thereof preferably dimensioned to have a length slightly less than the length of the band covered by the coil spring and the outer sections 15 and 16 are bent downwardly to offset the intermediate portions for a distance which is preferably greater than the thickness of the wire of the coil spring so that the edge portions of the overlapped terminal coils will be received within the groove formed between the offset sections 15 and 16.

When the longitudinal bands 12 and 13 are secured at their ends to the frame members 11 and when the terminal edge portions 14 of the underlying coil springs in one crosswise row have been properly disposed within the grooves 17 between the downwardly struck portions 15 and 16, the terminal portions of the coils are locked in position by means of a crosswise band 18 which is threaded through the openings aligned crosswise in the longitudinal bands with the crosswise bands adjacent the inner wall of the downwardly struck portions 15 and 16 and with the terminal portion 14 of the coil spring 10 disposed between the crosswise band 18 and the central portion 19 of the longitudinal band to block retrograde movement of the coil from the recess between the downwardly struck portions thereby permanently to lock the coil therebetween.

The ends of the crosswise bands may be secured to the frame member in any suitable manner. As illustrated in Figure 3, the end portion 20 of the band may be turned about the outer edge portion 21 of the terminal coil and the portion of the frame member 11 in side by side relation therewith to underlie the end portion of the strap in abutting relation for attachment as by means of spot welding indicated by the numeral 22 in Figure 3, or by means of a rivet 23, as illustrated in Figure 4. Both of these techniques for joining the metal parts require the use of special equipment which is carried to the spring assembly or else the assembled unit is transferred to special equipment for such operation. It is thus preferred to make use of means such as is illustrated in Figure 5 in which the portion of the band adjacent the frame is formed with a central opening 24 adapted to receive a tongue 25 on the end of the strap which is inserted through the opening from the underside and then turned back to effect the attached relation.

It will be apparent from the description that a simple and efficient means has been provided for effecting a permanent but flexible assembled relation of a multiplicity of coil springs for use in the manufacture of bed springs, innerspring mattresses and furniture. In brief, it is only necessary to mount the coil springs 10 in the desired spaced relation within a framework of frame members 11. The longitudinal bands 12 and 13 in laterally spaced apart parallel relation and in which the edge portions are struck downwardly in the desired spaced relation corresponding to the location of the coil springs may be secured in the desired laterally spaced apart relation between the frame members 11 or else the longitudinal bands may be secured thereto at their ends after the frame member has been located in position of use with the coils therebetween. The coil springs 10 are positioned with the terminal coils having their edges within the grooves and the crosswise bands 18 merely threaded through the slots, as described, to effect the assembled relation following which the ends of the crosswise straps are secured to the longitudinal frame members.

When, as in an innerspring mattress, the crosswise coil springs 30 and 31 are positioned in side by side relation, as illustrated in Figure 6, the concepts of this invention may be embodied in the use of but a single lengthwise band between adjacent rows of spring coils. For this purpose, the band is preferably selected to be wider in dimension so that the edge portions 32 and 33 struck downwardly will enable the formation of a central groove 34 therebetween of sufficient width to receive the edge portions 35 and 36 of adjacent coils in side by side relation. The cross bands 37 are threaded through the slots, as in the single modification previously described, to confine the two terminal portions 35 and 36 within the groove 34 now confined between downwardly struck portions 32 and 33 at the sides, the central portion of the longitudinal band 38 at the top and the crosswise band 37 at the bottom. In this position the edge portions of the terminal coils will be confined within the limited space of the recess that is formed to militate against displacement while permitting sufficient relative movement in flexure to enable free movement of the elements as desired in spring construction.

It will be apparent from the description that I have provided a new and improved process for assembling multiple spring elements in a simple and efficient manner into a composite unit for use in bed springs, mattresses and furniture. The interfitting relation of the lengthwise and crosswise bands with the edge portions of the coils locked in position therebetween provides for stability in the assembly while supplying a relatively smooth surface over which covers or other elements employed in the manufacture of such spring units may be applied without difficulty and without deformation to provide an uneven or uncomfortable support.

It will be evident that assembly of the type described enables the production of spring units by a process capable of mass production without excessive equipment and highly skilled labor and which enables replacement or repair of parts in a simple and efficient manner without the necessity for complete reassembly of elements.

It will be understood that various changes may be made in the details of construction, arrangement and operation and particularly with respect to the attachment of the end portions of the crosswise and longitudinal straps to the frame members, without departing from the spirit of the invention, especially as defined in the following claims.

I claim:

1. In a coil spring assembly having a plurality of coil springs aligned in lengthwise and crosswise rows, means for securing the coil springs in their assembled relation comprising a band extending in one direction over the outer edge portions of terminal coils in one row, said band having laterally spaced slits extending lengthwise through intermediate portions thereof in areas overlapping the coil springs with spaced slit portions offset from the central portion therebetween in the direction of the coil springs to form a groove therebetween in which the overlapped portion of the coil spring is received with the top side resting on the central portion and the bottom side spaced a short distance beneath the top side of the offset portions, another band extending in a transverse direction through the openings between the bottom side of the coil springs and the top side of the offset portions to confine the overlapped portion of the coil spring within the groove and between the bands.

2. In a coil spring assembly having a plurality of coil springs aligned in lengthwise and crosswise rows, the coils in one row being in side by side relation with the coils in an adjacent row, means for securing the coil springs in their assembled relation comprising a band extending lengthwise to overlap the adjacent edge portions of the rows of coils in side by side relation, said lengthwise band having laterally spaced splits extending lengthwise through intermediate portions thereof in areas overlapping the coil springs for a distance corresponding to the overlap with the spaced outer split portions offset from the central portion therebetween in the direction of the coil springs to form a groove therebetween in which the overlapped edge portions of the coil springs in side by side relation are received with one side of the spring coils resting on the central portion while the opposite sides are spaced a short distance from the adjacent offset portions, a crosswise band threaded crosswise through the openings between the spring coils and the portions offset therefrom to confine the overlapped portions of the coil springs within the groove and between the bands.

References Cited in the file of this patent

UNITED STATES PATENTS

| | | |
|---|---|---|
| 440,324 | Purefoy | Nov. 11, 1890 |
| 1,985,020 | Coopersmith | Dec. 18, 1934 |
| 2,364,966 | Gladstone | Dec. 12, 1944 |

FOREIGN PATENTS

| | | |
|---|---|---|
| 418,950 | Great Britain | Nov. 2, 1934 |